(No Model.)

A. H. WORREST.
FERTILIZER FEEDER.

No. 469,801. Patented Mar. 1, 1892.

Witnesses:
Dan'l H. Herr.
Geo. R. Lane

Inventor
Alfred H. Worrest
By Wm. R. Gerhart
Attorney

UNITED STATES PATENT OFFICE.

ALFRED H. WORREST, OF GLEN LOCH, PENNSYLVANIA.

FERTILIZER-FEEDER.

SPECIFICATION forming part of Letters Patent No. 469,801, dated March 1, 1892.

Application filed September 27, 1889. Serial No. 325,273. (No model.)

*To all whom it may concern:*

Be it known that I, ALFRED H. WORREST, a citizen of the United States, residing at Glen Loch, in the county of Chester and State of Pennsylvania, have invented certain Improvements in Fertilizer-Drill Feeders, of which the following is a specification.

This invention relates to improvements in drills for sowing fertilizers; and the object of my improvement is to lubricate the bearing-surfaces of the mechanism located in the hopper, which feeds the fertilizing material to the discharge-opening.

In sowing all fertilizers the machinery working in the hopper necessary to feed the fertilizing material to the discharge-opening becomes more or less clogged up. This is particularly the case when sowing "dissolved fertilizers," which are most generally used.
These fertilizers not only clog up between the surfaces of contact of the operating parts, but the acid in them causes the fertilizer to harden on those surfaces and corrode them, so that it is frequently necessary to take the machinery out of the hopper to separate the parts and scrape them. This is the case more or less with all fertilizer-sowers, the frequency with which the parts become obstructed depending upon the extent and location of the surfaces of contact and the manner in which they are protected against the fertilizer reaching them. Up to the present time it has been impossible to prevent the fertilizing material from working into the feed mechanism and choking it up, the material being of such character that it finds its way through any crevices between the working parts of the machinery sufficiently wide to permit the free action of those parts. Where the surfaces of contact are comparatively great it frequently happens that the fertilizer which has worked between them will harden so rapidly that stopping the drill during the dinner-hour will suffice for absolutely blocking the mechanism, so that it must be taken apart and cleaned before it can be further used.

My invention entirely prevents the choking up and stoppage of the distributing mechanism, as just described; and it consists in extending an oil-tube from the outside of the back board of the hopper into the interior feed mechanism of the drill, so that it may feed the oil on the surfaces of contact of the same, the discharge-opening of the tube being protected against the pressure of the fertilizing material in the hopper.

Figure 1:
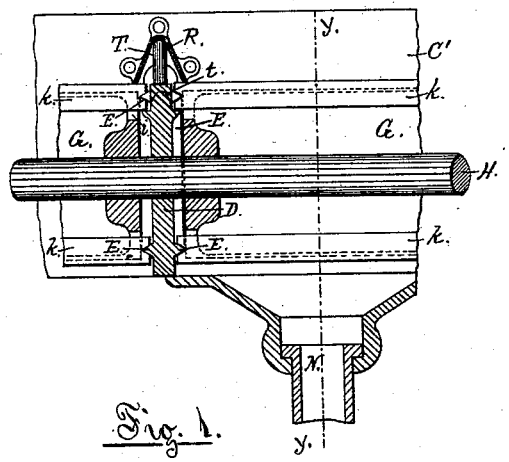
Figure 2:
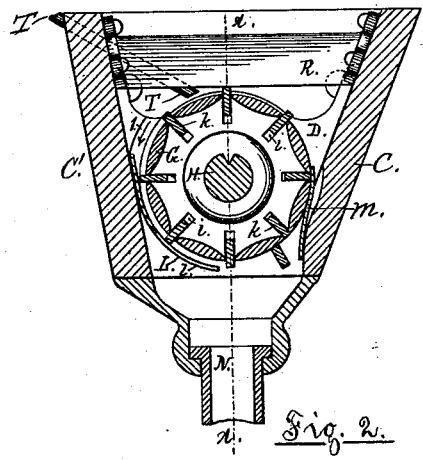
Figure 4:
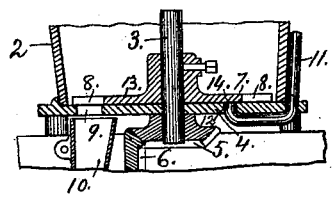
Figure 3:
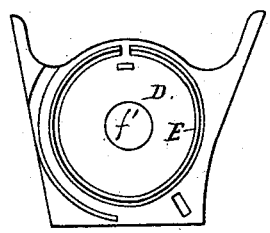
Figure 5:
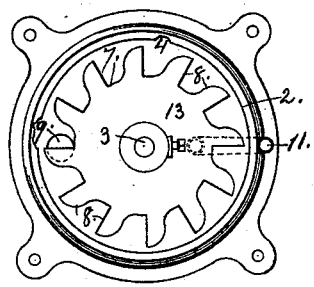

In Figures 1, 2, and 3 of the accompanying drawings, my invention is shown as applied to a fertilizer feeder attachment for graindrills for which Letters Patent No. 355,671, dated January 4, 1887, have been granted to me by the United States, in which feedwheels having a vertical rotary movement above the discharge-opening are used. It is also shown in Figs. 4 and 5 as applied to a fertilizer feeder attachment in which a feedwheel operates in a horizontal plane above the discharge-opening.

In the drawings, in which similar letters and figures indicate like parts throughout the several views, Fig. 1 is a longitudinal vertical section on the line *x x* of Fig. 2, showing a partition dividing adjoining compartments of the hopper and parts connected therewith. Fig. 2 is a transverse sectional view through one of the compartments on the line *y y* of Fig. 1. Fig. 3 is a side elevation of one of the partitions, which carries a V-shaped cam on each side which serve as guides for the feed-slides. Fig. 4 is a vertical section through a circular hopper, showing the application of my invention to a horizontal feed-wheel; and Fig. 5 a top or plan view of the same, the lid of the hopper being removed.

It has not been thought necessary to show the bearings or operating mechanism of the main shafts in the drawings, as the invention applies only to the surfaces of contact of the interior operating parts.

In the first three figures, C C' indicate, respectively, the front and back boards of a longitudinal hopper divided into compartments by transverse partitions D. Each of these partitions is provided with a centrally-located opening *f'*, through which a shaft H passes, and has formed upon each side thereof a V-shaped cam E. The shaft H extends through the entire length of the hopper, passing through the openings *f'* of the partitions, and is journaled in proper bearings in the ends of the hopper. Between the partitions D in each compartment there is a cylinder G, keyed to the shaft H and rotated by it. The cylinders G are provided with transverse slots $i$, which extend through their entire length parallel with the axis and project through their ends in radial lines from the center a portion of their diameter. In these slots, which serve as guides for the same, work the feed-slides $k$. These slides have a V-shaped groove cut in each end, adapted to engage the V-shaped cams E on each side of the partitions D. Regulating feed-plates L extend from one partition D to the other lengthwise of each compartment, and upon the opposite sides of each compartment is located a leakage-spring $m$, which is of flexible metal and lies against the cylinder G its whole length between the partitions D, its lower edge being fast to the front board C, preventing the leakage of material from the hopper. The feed-slides $k$ rest loosely in the slots $i$, and as the cylinder G revolves in the direction of the arrow 1 they are projected through the surface of the cylinder, when uppermost therein, by the cam-curves E on the partitions D, and carry with them a portion of the fertilizing material in the hopper when they reach the upper edge of the regulating-plate L, which is bent in a circle to suit the arc of their travel, and delivers the same through the opening $l$ in that plate into the funnel N. As the feed-slides rise with the rotation of the cylinder they are drawn inward by the cam-curves E, as shown on the right of Fig. 2. Each partition is covered by a peaked shield or cap R, which is bolted to the front and back boards of the hopper and protects the upper part of the partition from the pressure of the superincumbent fertilizing material. An oil-tube T extends from the outside of the back board inward over each partition toward its center, sloping downward, so that its inner end is considerably lower than the outer and rests a little above the top of the partition at a point outside of that at which the cam-curves E begin to slope downward toward the back board. Oil is fed to the cam-curves through these tubes, falling on the top of the partitions from the discharge end of the tubes and thence flowing down onto the cams, the edges of the partitions being beveled at the point where the oil falls on them to facilitate its passage to the cam-curves, as shown by the dotted lines at $t$, Fig. 1.

Figs. 4 and 5 illustrate the application of my invention to a fertilizer-feed mechanism operating horizontally in the bottom of a hopper. In these figures, 2 represents a circular hopper, 3 a vertical shaft projecting upward through an opening in the bottom plate 4 of the hopper, 5 a cog-wheel attached to the shaft 3 below the plate 4, and 6 a bevel-gear meshing with the cog 5 to impart motion thereto. 7 is a feed-wheel keyed to the shaft 3 and resting on the bottom of the hopper. It is provided with radial arms or wings 8, that carry the fertilizing material in the hopper to the outlet-opening 9, whence it passes to the feed-tube 10. An oil-tube 11 is secured in a vertical position to the side of the hopper, the upper end extending above the plane occupied by the feed-wheel. The other end passes around the lower edge of the hopper and beneath the bottom thereof toward its center, and is bent upward and inserted in an aperture 12, located beneath the annular portion 13 of the feed-wheel 7, the end 14 of the pipe being flush with the upper surface of the bottom plate 4.

The foregoing descriptions illustrate the manner in which the bearing-surfaces of either a vertically or horizontally acting feed-wheel of a fertilizer-sower may be oiled without permitting the material in the hopper to interfere with the feeding of the oil to those parts. The same principles may be applied to any of the well-known fertilizer-sowing machines now in use, the manner of reaching the bearing-surfaces of the feed mechanism being varied to suit the construction of the machine.

Having thus described my invention, what I claim as new, and desire to secure by Letters Patent, is—

1. The combination, with a fertilizer feed-hopper and mechanism located therein, of an oil tube or pipe extending from the wall of the hopper inward beyond the inner face or side thereof and having its discharge end located above or in a bearing-surface of said mechanism between the edges or sides of said bearing-surface, substantially as and for the purpose specified.

2. The combination, with a fertilizer feed-hopper and mechanism located therein, of an oil tube or pipe extending from the outside of said hopper into the body thereof and having its inner end adapted to discharge on the bearing-surfaces of the interior mechanism, and a cap or shield adapted to protect the discharge end of said tube or pipe, substantially as and for the purpose specified.

3. The combination, with a fertilizer feed-hopper divided by partitions having bearing-surfaces for the operating mechanism attached thereto, of an oil tube or pipe extending from the outside of said hopper into the body thereof and adapted to discharge on said bearing-surfaces, substantially as and for the purpose specified.

4. The combination, with a fertilizer feed-hopper divided by partitions having bearing-surfaces for the operating mechanism attached thereto, of an oil tube or pipe extending from the outside of said hopper into the body thereof and adapted to discharge on said bearing-surfaces, and a cap or shield located above said tube or pipe, substantially as and for the purpose specified.

5. The combination, with a fertilizer feed-hopper divided by partitions having beveled upper edges, of bearing-surfaces for the operating mechanism attached to the faces of said partitions, an oil tube or pipe extending from the outside of the hopper into the body thereof and adapted to discharge on the beveled edges of the partitions above said bearing-surfaces, and a cap or shield located above said tube or pipe, substantially as and for the purpose specified.

6. The combination, with a fertilizer feed-hopper divided by partitions having V-shaped cams attached to the faces thereof, of mechanism engaging said cams, and an oil tube or pipe extending from the outside of the hopper into the body thereof and adapted to discharge on the side of the cams on which said mechanism passes downward, substantially as and for the purpose specified.

7. The combination, with a fertilizer feed-hopper divided by partitions having beveled upper edges, of V-shaped cams attached to the sides of said partitions, mechanism engaging said cams, an oil tube or pipe extending from the outside of the hopper into the body thereof and adapted to discharge on the beveled edges of the partitions above the sides of the cams on which said mechanism travels downward, and a cap or shield located above said tube or pipe, substantially as and for the purpose specified.

A. H. WORREST.

Witnesses:
JACOB HALBACH,
WM. R. GERHART.